(12) United States Patent
Hashioka et al.

(10) Patent No.: US 10,710,844 B2
(45) Date of Patent: Jul. 14, 2020

(54) CHAIN STRETCH DETECTION DEVICE, CHAIN STRETCH DETECTION METHOD, AND PASSENGER CONVEYOR

(71) Applicant: MITSUBISHI ELECTRIC CORPORATION, Chiyoda-ku (JP)

(72) Inventors: Yutaka Hashioka, Chiyoda-ku (JP); Reiji Yamasa, Chiyoda-ku (JP); Kazutoshi Akazawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/346,754

(22) PCT Filed: Nov. 24, 2016

(86) PCT No.: PCT/JP2016/084804
§ 371 (c)(1),
(2) Date: May 1, 2019

(87) PCT Pub. No.: WO2018/096615
PCT Pub. Date: May 31, 2018

(65) Prior Publication Data
US 2020/0055710 A1     Feb. 20, 2020

(51) Int. Cl.
*B66B 29/00*     (2006.01)
*B66B 25/00*     (2006.01)
(Continued)

(52) U.S. Cl.
CPC .............. *B66B 29/00* (2013.01); *B66B 31/00* (2013.01); *B65G 17/38* (2013.01); *F16G 13/06* (2013.01); *F16H 7/06* (2013.01); *F16H 2007/087* (2013.01)

(58) Field of Classification Search
None
See application file for complete search history.

(56) References Cited

U.S. PATENT DOCUMENTS 6,179,111 B1 *   1/2001   Ratz .................... B64H 29/003
                                                    198/370.05
2007/0170037 A1 *  7/2007  Kuroda .................. B66B 29/00
                                                    198/322

FOREIGN PATENT DOCUMENTS

JP         11-199168 A        7/1999
JP       2009084028 A  *      4/2009
(Continued)

OTHER PUBLICATIONS

International Search Report dated Feb. 21, 2017 in PCT/JP2016/084804 filed on Nov. 24, 2016.

*Primary Examiner* — Kavel Singh
(74) *Attorney, Agent, or Firm* — Xsensus LLP

(57) ABSTRACT

The chain stretch detection device is configured to detect a stretch of a chain in a power transmission device. The power transmission device includes: a driving sprocket; a driven sprocket; and a chain, which is wound around the driving sprocket and the driven sprocket, and is configured to transmit power of the driving sprocket to the driven sprocket. The chain stretch detection device includes: a meshing height measurement device configured to measure meshing heights of the chain in a range in which the driven sprocket meshes with and the chain; and a signal processing device configured to determine a height difference between adjacent rollers in the chain through use of signals acquired by the meshing height measurement device and estimate an amount of the stretch of the chain based on the determined height difference.

8 Claims, 20 Drawing Sheets

(51) Int. Cl.
*B66B 31/00* (2006.01)
*B65G 17/38* (2006.01)
*F16G 13/06* (2006.01)
*F16H 7/06* (2006.01)
*F16H 7/08* (2006.01)

(56) References Cited

FOREIGN PATENT DOCUMENTS

| JP | 2011-173719 A | | 9/2011 |
|---|---|---|---|
| JP | 2015178413 A | * | 10/2015 |

* cited by examiner

1

D 3
(NUMBER OF TEETH:Z)

(c)

CHAIN STRETCH DETECTION DEVICE, CHAIN STRETCH DETECTION METHOD, AND PASSENGER CONVEYOR

TECHNICAL FIELD

This invention relates to a chain stretch detection device and a chain stretch detection method for detecting stretch of a chain, and to a passenger conveyor including the chain stretch detection device.

BACKGROUND ART

In a chain to be used for power transmission, stretch in a longitudinal direction occurs, which is caused by friction generated between members at a rotary joint portion of the chain due to operations of the chain over years. This stretch appears as a phenomenon in which intervals of respective centers of adjacent rollers in the chain increase. The occurrence of the stretch in the chain may cause loosening of the chain and cause defects such as tooth-skipping. Moreover, the occurrence of the stretch in the chain may cause a meshing position, which is a position at which the chain and a sprocket mesh with each other, to move from a tooth bottom to a tooth top of the sprocket. Such movement may increase shearing stress generated in teeth of the sprocket and cause defects such as loss of teeth. Typically, slide wear generated at the rotary joint portion is suppressed with lubricating oil supplied to the rotary joint portion of the chain in the case of drive of the chain. However, such measure merely suppresses progress of the wear generated at the rotary joint portion and cannot prevent the stretch of the chain over years caused by long-term drive of the chain.

In view of the foregoing, there has hitherto been known a chain stretch detection device having the following configuration, which is used as a measure for preventing, in advance, the defects such as tooth-skipping or loss of teeth. Through utilization of the phenomenon in which the meshing position at which the chain and the sprocket mesh with each other moves from the tooth bottom to the tooth top when the stretch occurs in the chain, the meshing position or a meshing height is measured, and an amount of the stretch of the chain is specified based on the meshing position or the meshing height having been measured. Then, a state of the stretch in the chain is grasped based on the specified stretch amount of the chain (see, for example, Patent Literature 1).

CITATION LIST

Patent Literature

[PTL 1] JP 11-199168 A

SUMMARY OF INVENTION

Technical Problem

However, in the related-art chain stretch detection device, it is assumed that, for example, when the stretch evenly occurs in an entire region of the chain, the meshing heights are uniformly increased at portions of the chain in mesh with the sprocket. Moreover, in the related-art chain stretch detection device, it is assumed that, when the stretch locally occurs in the chain, the meshing heights are constant at the portions of the chain at which the stretch occurs.

Meanwhile, in the actual chain, due to the structural characteristic of the chain, the dimensional relationship between a pair of sprockets, inclination of a line connecting respective rotary axes of the pair of sprockets with respect to a horizontal plane, and flexure expressed by a difference between the actual number of links of the chain and the appropriate number of links of the chain calculated based on a dimension between the pair of sprockets and a dimension between respective center axes of the pair of sprockets, it is not necessarily true that the meshing height correlated with the stretch of the chain can be measured at any suitable position of the portions of the chain in mesh with the sprocket. Thus, there has been a problem in that accuracy of the measured stretch amount of the chain is poor.

This invention provides a chain stretch detection device, a chain stretch detection method, and a passenger conveyor, which are capable of measuring an amount of the stretch of a chain with high accuracy.

Solution to Problem

According to one embodiment of the present invention, there is provided a chain stretch detection device configured to detect a stretch of a chain in a power transmission device, the power transmission device including: a driving sprocket configured to rotate through transmission of a drive force thereto; a driven sprocket supported on a rotatable rotary shaft; and a chain, which is wound around the driving sprocket and the driven sprocket, and is configured to transmit power of the driving sprocket to the driven sprocket, the chain stretch detection device including: a meshing height measurement device configured to measure meshing heights of the chain in a range in which the driving sprocket or the driven sprocket meshes with the chain; and a signal processing device configured to determine a height difference between adjacent rollers in the chain through use of signals acquired by the meshing height measurement device and estimate an amount of the stretch of the chain based on the determined height difference.

Advantageous Effects of Invention

The chain stretch detection device according to the one embodiment of this invention includes: a meshing height measurement device configured to measure meshing heights of a chain in a range in which a driving sprocket or a driven sprocket meshes with a chain; and a signal processing device configured to determine a height difference between adjacent rollers in the chain through use of signals acquired by the meshing height measurement device and estimate an amount of the stretch of the chain based on the determined height difference. Therefore, the amount of the stretch of the chain can be measured with high accuracy.

DESCRIPTION OF EMBODIMENTS

First Embodiment

Figure 1:
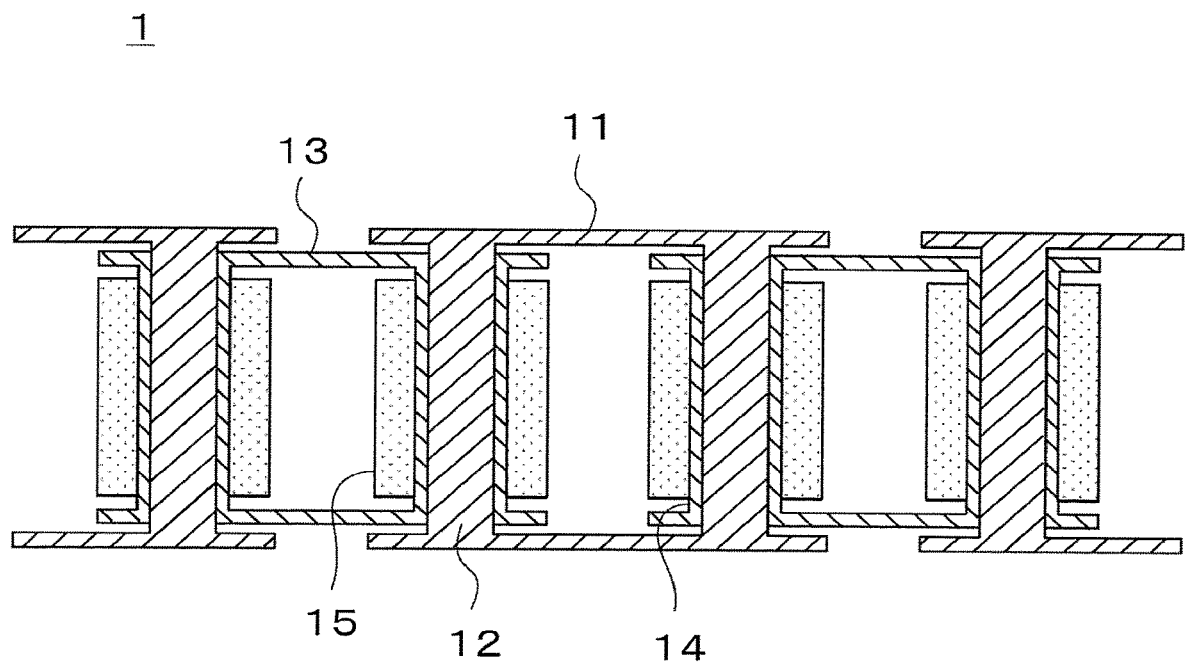
FIG. 1 is a sectional view for illustrating a structure of a chain to be subjected to detection of stretch by a chain stretch detection device according to a first embodiment of this invention.

FIG. 1 is a sectional view for illustrating a structure of a chain to be subjected to detection of stretch by a chain stretch detection device according to a first embodiment of this invention. A chain 1 to be used for power transmission includes pairs of outer plates 11, pins 12, pairs of inner plates 13, bushes 14, and rollers 15. The pair of outer plates 11 are opposed to each other. Two pins 12 are provided so as to extend across each pair of outer plates 11. The pair of inner plates 13 are opposed to each other. Two bushes 14 are provided so as to extend across each pair of inner plates 13. The bushes 14 are each formed into a cylindrical shape. The rollers 15 are provided around the bushes 14, respectively. The pairs of outer plates 11 and the pairs of inner plates 13 are alternately arranged in a longitudinal direction of the chain 1.

The pins 12 are fixed to the outer plates 11 by swaging. The bushes 14 are fixed to the inner plates 13. Moreover, the pins 12 are inserted into the bushes 14. The pair of outer plates 11 and the pair of inner plates 13, which are adjacent to each other in the longitudinal direction, are coupled to each other through insertion of the pins 12 into the bushes 14. The portions of the chain 1 at which the pins 12 are inserted into the bushes 14 serve as joints of the chain 1. In other words, the chain 1 is bendable at the portions of the chain 1 at which the pins 12 are inserted into the bushes 14.

The rollers 15 are mounted around the bushes 14 fixed to the inner plates 13 so that the rollers 15 are rotatable relative to the bushes 14. Thus, the rollers 15 mesh with teeth of sprockets in a state of being rotatable relative to the bushes 14. A reference length of the chain 1 to be given in a case of evaluating the stretch of the chain 1 is defined with a dimension between adjacent rollers 15. The reference length of the chain is referred to as "reference pitch p" of the chain 1.

Figure 2:
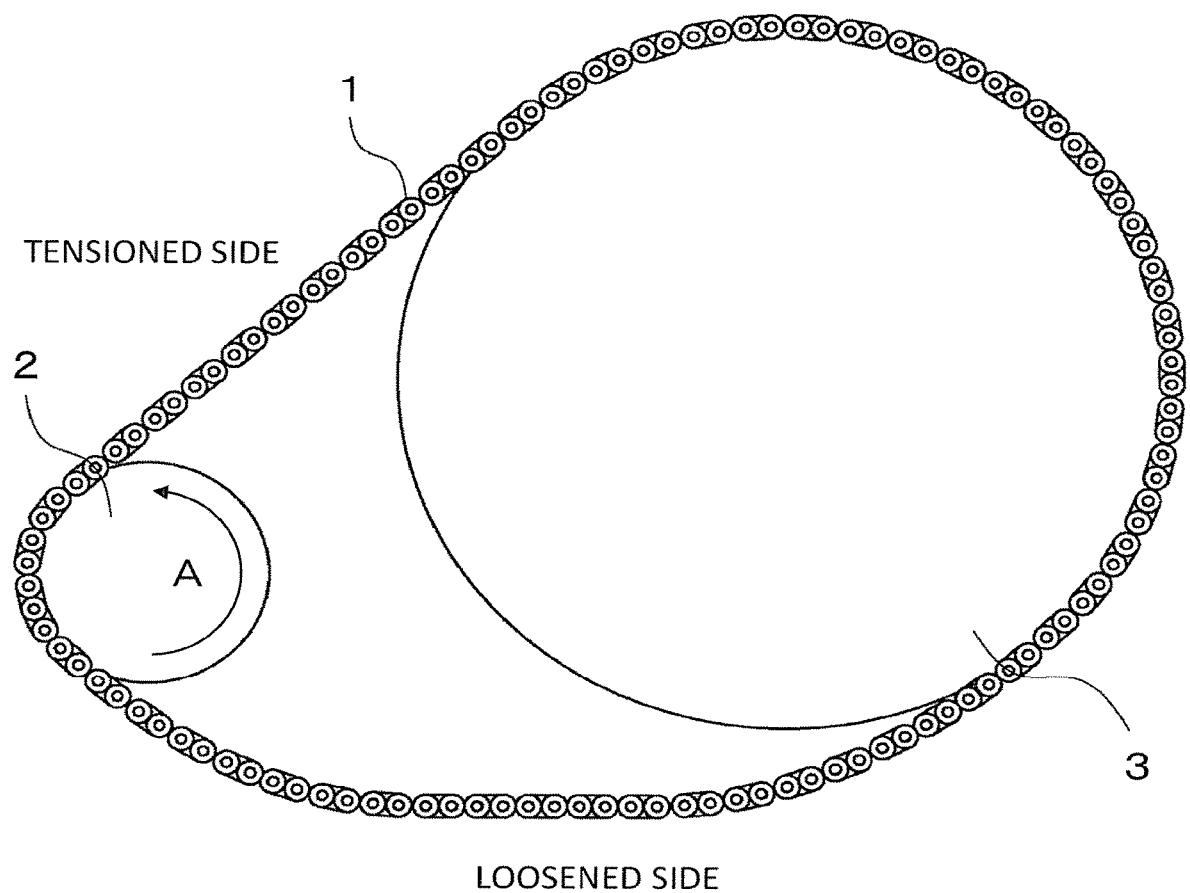
FIG. 2 is a view for illustrating a power transmission device including the chain of FIG. 1.

FIG. 2 is a view for illustrating a power transmission device including the chain 1 of FIG. 1. The power transmission device includes a driving sprocket 2, a driven sprocket 3, and the chain 1. The driving sprocket 2 is configured to rotate through transmission of a drive force thereto. The driven sprocket 3 is provided apart from the driving sprocket 2 and is supported on a rotatable rotary shaft. The chain 1 is wound around the driving sprocket 2 and the driven sprocket 3. When the driving sprocket 2 rotates counterclockwise as indicated by the arrow A of FIG. 2, a portion of the chain 1 which is located between the driving sprocket 2 and the driven sprocket 3 and on an upper side corresponds to a tensioned-side portion, and a portion of the chain 1 which is located between the driving sprocket 2 and the driven sprocket 3 and on a lower side corresponds to a loosened-side portion. A tensile force corresponding to a transmitted load torque acts on the tensioned-side portion of the chain 1. The tensile force corresponding to the transmitted load torque does not act on the loosened-side portion of the chain 1, but a tensile force caused by the own weight of the loosened-side portion and a tensile force caused by small fluctuation due to vibration generated along with a rotational motion of the chain 1 act on the loosened-side portion of the chain 1.

At portions of the chain 1 in mesh with the sprocket, an angle of each joint is determined based on an angle of each tooth determined by the number of teeth of the sprocket. Moreover, in a range of from a portion of the chain 1 at which engagement with the sprocket starts and a portion of the chain 1 at which the engagement with the sprocket ends, a rotating and bending motion of the joint is performed along with movement of the chain 1.

The tensile force corresponding to the transmission torque acts on the joint at which the rotating and bending motion is performed. Thus, in the rotating and bending motion, a sliding motion with a surface pressure is performed on respective contact slide surfaces of the pins 12 and the bushes 14. With this, wear occurs in the respective contact slide surfaces of the pins 12 and the bushes 14. In particular, at both end portions of each of the pins 12, local contact occurs with respect to corners of the bushes 14. Thus, the wear at both end portions of the pin 12 is further promoted. Due to the wear in the contact slide surfaces of the pins 12 and the bushes 14, a gap is formed between the pin 12 and the bush 14 as compared to the initial state. This gap is the main cause of the stretch of the chain 1.

Figure 3:
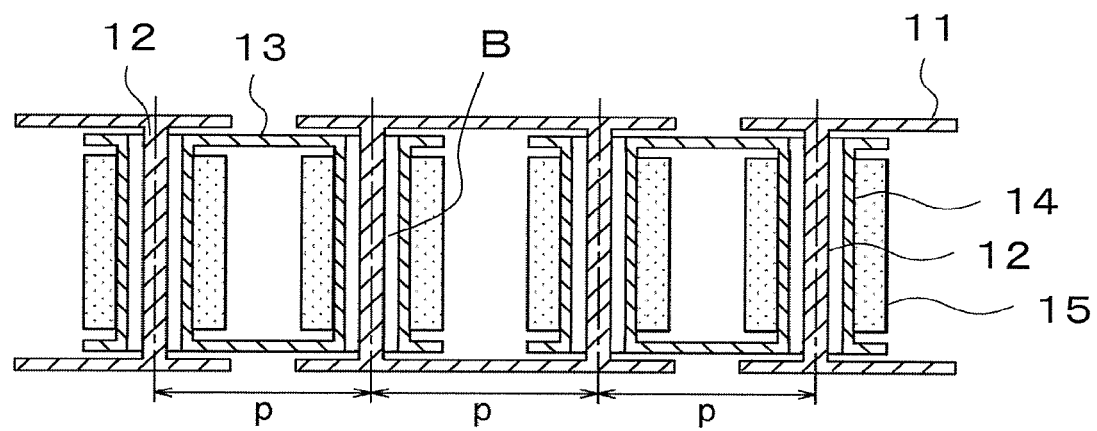
FIG. 3 is a sectional view for illustrating the chain of FIG. 1 in which a gap is formed between slide contact surfaces of a pin and a bush.
Figure 4:
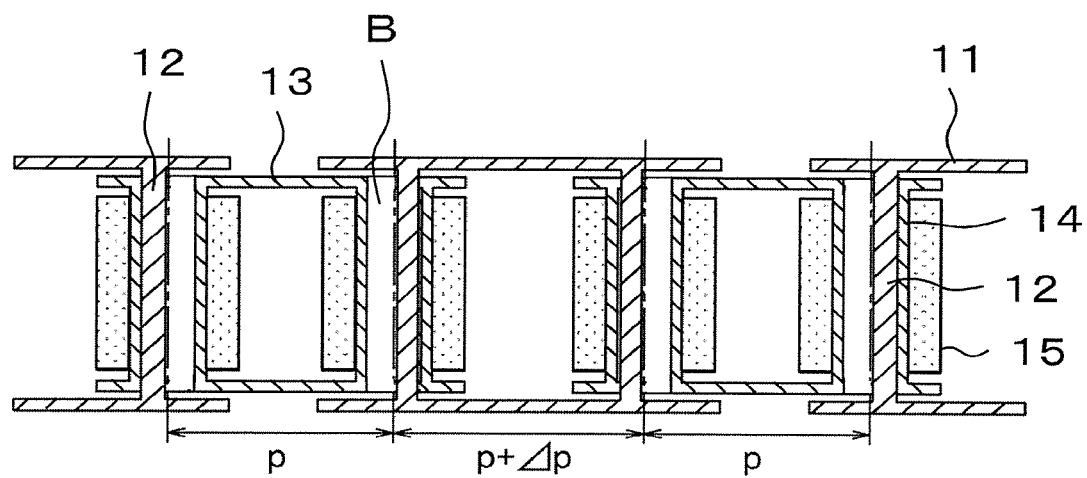
FIG. 4 is a sectional view for illustrating a state in which a tensile force acts on the chain of FIG. 3.
Figure 5:
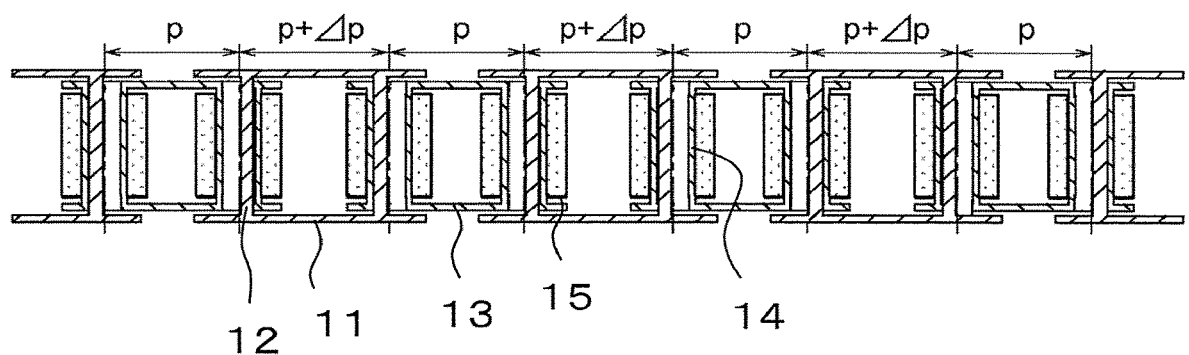
FIG. 5 is a sectional view for illustrating a state in which the number of links of the chain of FIG. 4 is increased.

FIG. 3 is a sectional view for illustrating the chain 1 in which a gap is formed between slide contact surfaces of the pin 12 and the bush 14 of FIG. 1. FIG. 4 is a sectional view for illustrating a state in which a tensile force acts on the chain 1 of FIG. 3. FIG. 5 is a sectional view for illustrating a state in which the number of links of the chain 1 of FIG. 4 is increased. FIG. 3 is an illustration of a state in which the tensile force does not act on the chain 1. Due to slide wear over years, a gap B is uniformly formed between the pin 12 and the bush 14.

When the tensile force acts on the chain 1, the pin 12 moves relative to the bush 14 by the dimension of the gap B formed between the pin 12 and the bush 14 so that the pin 12 and the bush 14 are brought into contact with each other. Evaluation of the stretch of the chain 1 is defined based on a dimension between adjacent rollers 15, and is measured based on a change with respect to the reference pitch p.

Both end portions of the bush 14 are fixed to the inner plates 13, and a distance between respective centers of a pair of bushes 14 fixed to the same inner plates 13 is set as the reference pitch p of the chain 1. The distance between the pair of bushes 14 fixed to the same inner plates 13 does not change unless the inner plate 13 stretches. With an allowable tensile force of the chain 1 and a material and a shape of the inner plate 13, a tensile force which acts with normal torque transmission does not cause the change in distance between the pair of bushes 14 fixed to the same inner plates 13.

The distance between respective centers of the pair of adjacent bushes 14 is equal to a distance between respective centers of the pair of adjacent rollers 15. When the chain 1 having been stretched by the gap B formed between the pin 12 and the bush 14 by the slide wear is compared with the chain 1 in the initial state without any slide wear, in the stretched chain 1, only the distance between the pair of rollers 15 provided to the same outer plates 11 is extended with respect to the reference pitch p, whereas the dimension between the pair of rollers 15 provided to the same inner plates 13 does not change. That is, the stretch of the chain 1 caused by the gap B between the pin 12 and the bush 14 due to the slide wear between the pin 12 and the bush 14 over years occurs only between the pair of rollers 15 provided to the same outer plates 11, and the distance between the adjacent rollers 15 extends every other roller 15.

Figure 6:
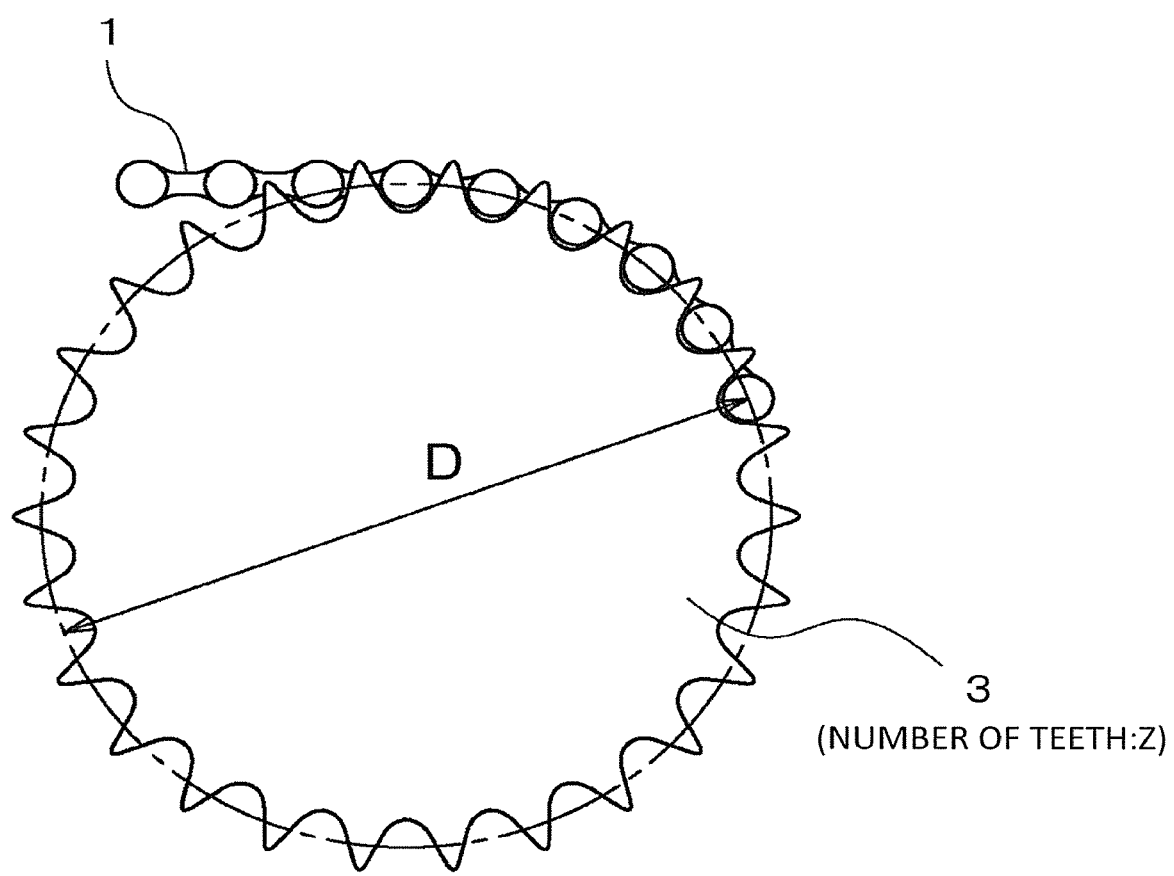
FIG. 6 is a view for illustrating meshing between the chain and a driven sprocket in an initial state in which the stretch has not occurred in the chain.
Figure 7:
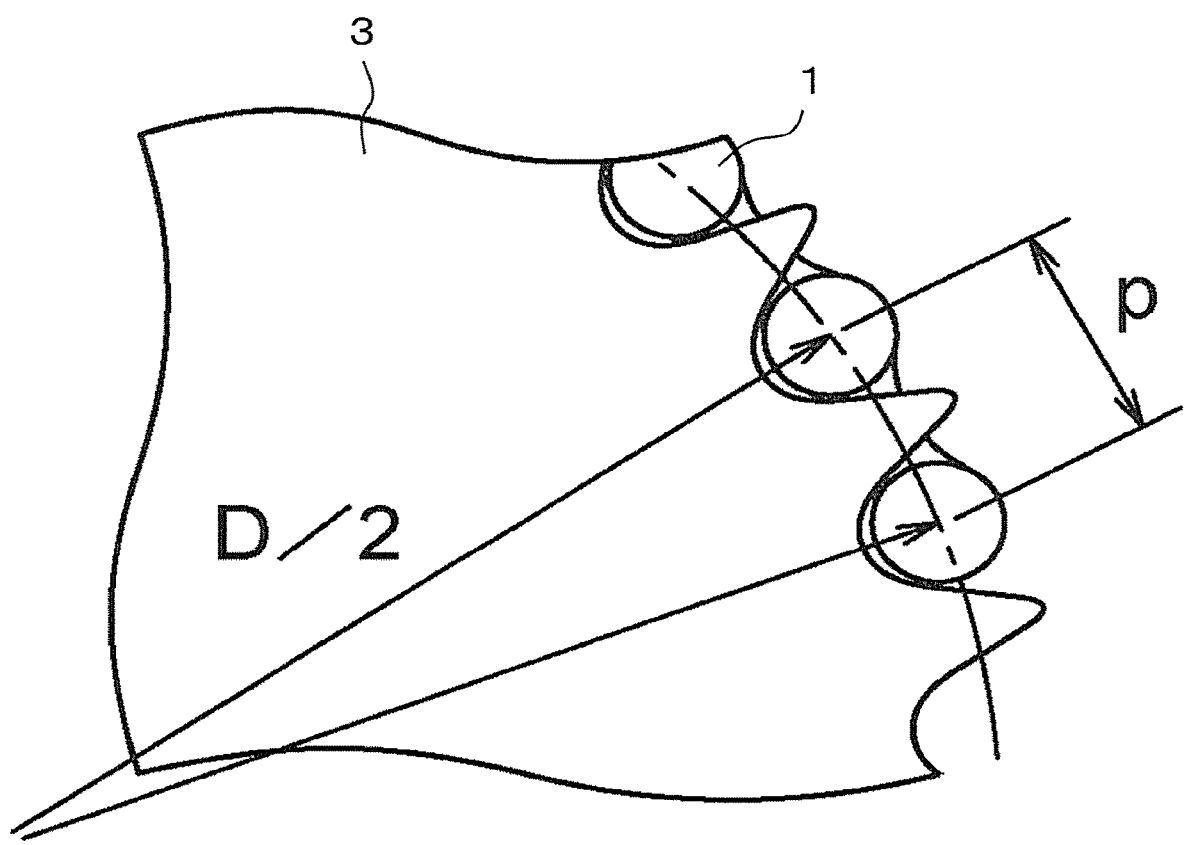
FIG. 7 is an enlarged view for illustrating the chain and the driven sprocket of FIG. 6.

Next, description is made of meshing between the chain 1 and the driven sprocket 3. FIG. 6 is a view for illustrating meshing between the chain 1 and the driven sprocket 3 in an initial state in which the stretch has not occurred in the chain 1. FIG. 7 is an enlarged view for illustrating the chain 1 and the driven sprocket 3 of FIG. 6. In the actual chain 1, a small gap is defined between members for smooth operation, and the stretch appears in the chain 1 from the initial state due to the presence of the gap. However, this gap is considered as error in the first embodiment.

The pitch length p of the chain 1 is defined by standard with respect to model numbers given in accordance with tension strength of the chain 1. At positions corresponding to a pitch diameter D determined by the following Expression (1) through use of the pitch length p of the chain 1 and the number of teeth z of the driven sprocket 3, the chain 1 meshes with the teeth of the driven sprocket 3.

$$D \times \sin(180/Z) = p \quad (1)$$

The pitch diameter D is uniquely determined when the model number of the chain 1 and the number of teeth z of the driven sprocket 3 are determined. Therefore, positions of the rollers 15 on the driven sprocket 3 can be determined in advance by geometrical construction.

Next, description is made of a case in which the stretch uniformly occurs in the entire region of the chain 1. It has hitherto been considered that, with the uniform stretch of the chain 1, the rollers 15 mesh with the driven sprocket 3 at positions corresponding to the pitch diameter D which is calculated through use of a value obtained by adding a length Δp corresponding to the stretch to the pitch length p of Expression (1) described above.

However, as illustrated in FIG. 5, because of the reason in terms of the structure of the chain 1, the change in pitch length p due to the stretch occurs only in the distance between respective centers of the pair of rollers 15 provided to the same outer plates 11, and the distance between respective centers of the pair of rollers 15 provided to the same inner plates 13 does not change. That is, in the chain 1 in which the stretch occurs uniformly in the entire periphery, the distance between the respective centers of adjacent rollers 15 extends only at the portion of the outer plates 11, and hence the change in distance between respective centers of adjacent rollers 15 occurs every other roller 15 among the arrayed rollers 15. Therefore, the meshing positions of the rollers 15 in inter-tooth spaces of the driven sprocket 3 in the case in which the stretch occurs in the chain 1 cannot be uniquely determined by Expression (1) described above.

Next, description is made of a winding state of the chain 1 and the driven sprocket 3 under a state in which power is transmitted. Under a state in which the chain 1 does not have the stretch in an entire region thereof, the rollers 15 mesh with teeth of the driven sprocket 3 at positions corresponding to the pitch diameter D calculated with Expression (1) described above in a range in which the chain 1 is wound around the driven sprocket 3.

Figure 8:
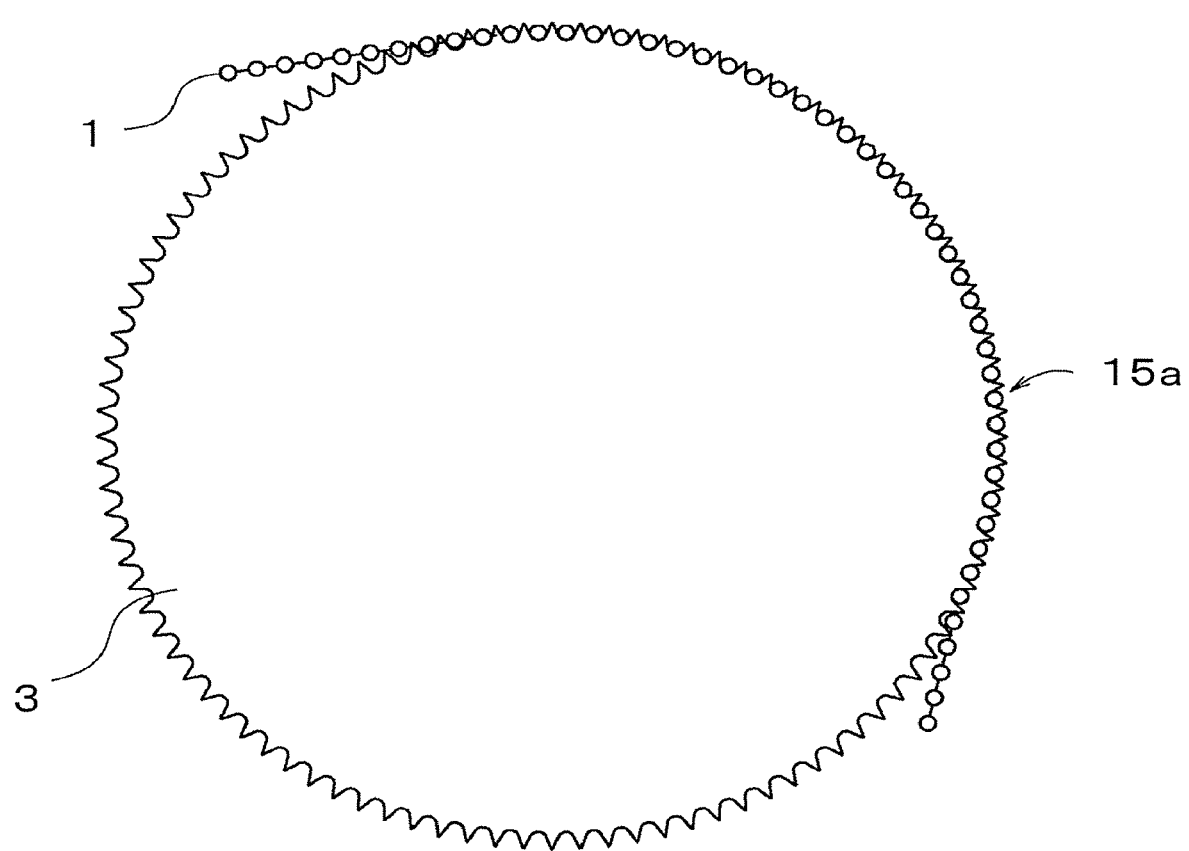
FIG. 8 is a view for illustrating a state in which the chain having the stretch in an entire region thereof is wound around the driven sprocket.
Figure 9:
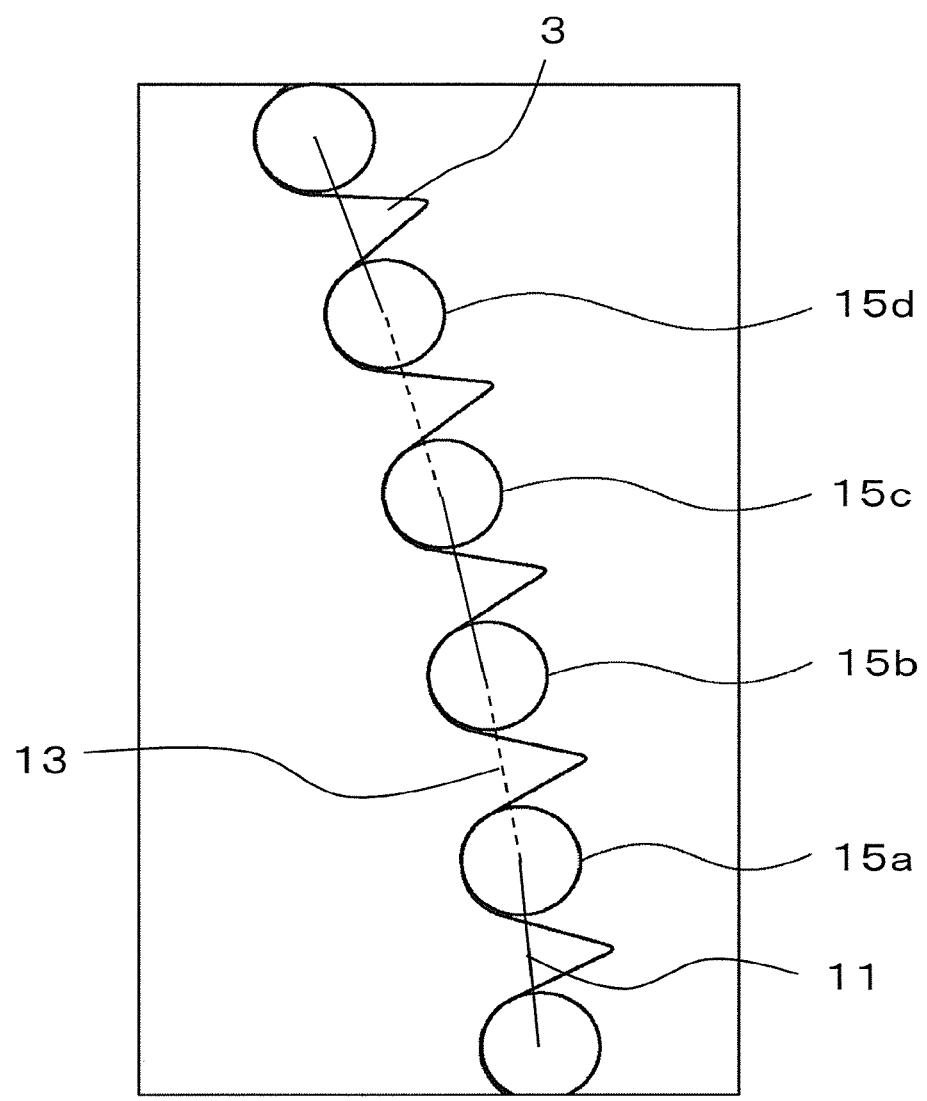
FIG. 9 is an enlarged view for illustrating main parts of the chain and the driven sprocket of FIG. 8.

FIG. 8 is a view for illustrating a winding state of the chain 1 having the stretch in the entire region thereof and the driven sprocket 3. FIG. 9 is an enlarged view for illustrating main parts of the chain 1 and the driven sprocket 3 of FIG. 8. Regardless of the state of the stretch of the chain 1, in a range of the driven sprocket 3 in which the chain 1 is wound around the driven sprocket 3, there is a tooth held in a meshing state which is the same as that given in the case in which the chain 1 having no stretch is wound.

In experience, such tooth is present on extension of a line connecting respective rotary axes of the driving sprocket 2 and the driven sprocket 3. An accurate position moves in accordance with conditions which change every moment, such as a load acting on the chain 1, the own weight of the chain 1 on the flexure side, and friction coefficients of tooth surfaces of the driven sprocket 3. In the first embodiment, a tooth which is present on extension of the line connecting respective rotary axes of the driving sprocket 2 and the driven sprocket 3 corresponds to a tooth held in a meshing state which is the same as that given in the case in which the chain 1 having no stretch is wound regardless of the state of the stretch of the chain 1.

A distance between the pair of rollers 15 provided to the same outer plates 11 extends, and a distance between the pair of rollers 15 provided to the same inner plates 13 does not change. Thus, the distance between adjacent rollers 15 extends every other roller 15 among the plurality of arrayed rollers 15. In FIG. 9, in the order from the tooth which meshes at the same position as the meshing position given when the chain 1 has no stretch, the broken lines represent the inner plates 13, and the solid lines represent the outer plates 11.

When a first roller 15a arranged on a backward side with respect to the inner plate 13 in a rotation direction of the driven sprocket 3 is located at a position of meshing with the driven sprocket 3 on a pitch circle given in a state of having no stretch, a second roller 15b on a forward side with respect to the first roller 15a in the rotation direction is arranged coaxially with the bush 14 fixed to the inner plate 13 which is the same as the inner plate 13 to which the first roller 15a is fixed. Therefore, an inter-axial distance between the first roller 15a and the second roller 15b is equal to the chain pitch. Thus, the second roller 15b is also on the pitch circle.

A third roller 15c arranged on a forward side with respect to the second roller 15b in the rotation direction is arranged coaxially with the bush 14 that allows passage of the pin 12 fixed to the outer plate 11, which is the same as the outer plate 11 that allows passage of the pin 12 passing through the second roller 15b. The distance between the pair of bushes 14 provided to the outer plate 11 is increased by the amount of the gap B between the pin 12 and the bush 14 formed by the wear between the pin 12 and the bush 14. Therefore, an inter-axial distance between the second roller 15b and the third roller 15c becomes larger than the chain pitch. The third roller 15c rotates with a radius having an axis of the second roller 15b as a center and being larger than the chain pitch by the amount of the stretch. Therefore, the third roller 15c meshes with the next tooth on the drive sprocket 3 on a circle having a radius larger than that of the pitch circle of the driven sprocket 3. This means that, within the teeth of the driven sprocket 3, the third roller 15c meshes at a position shifted from the tooth bottom to the tooth top in the radial direction of the driven sprocket 3.

A fourth roller 15d is coaxial with the bush 14 fixed to the inner plate 13 which is the same as the inner plate 13 to which the third roller 15c is fixed. Therefore, an inter-axial distance between the fourth roller 15d and the third roller 15c is equal to the chain pitch. The third roller 15c is located within an inter-tooth space of the driven sprocket 3 on the circle having a radius larger than the pitch diameter of the driven sprocket 3. Therefore, the fourth roller 15d which rotates with a radius corresponding to the chain pitch having an axis of the third roller 15c as a center is located on a circle having a radius smaller than that of a circle having a center at the center of the driven sprocket 3 on which the third roller 15c is located.

As described above, with the roller 15 meshing with the teeth of the driven sprocket 3 on the pitch circle as in the case of the chain having no stretch as a base point, the roller 15 which is located on a forward side of the outer plate 11 in the rotation direction meshes with an inter-tooth space at a position farther apart from the center of the driven sprocket 3 in the inter-tooth space of the driven sprocket 3, and the roller 15 which is located on the next further forward side in the rotation direction meshes with an inter-tooth space at a closer position from the center of the driven sprocket 3.

Figure 10:
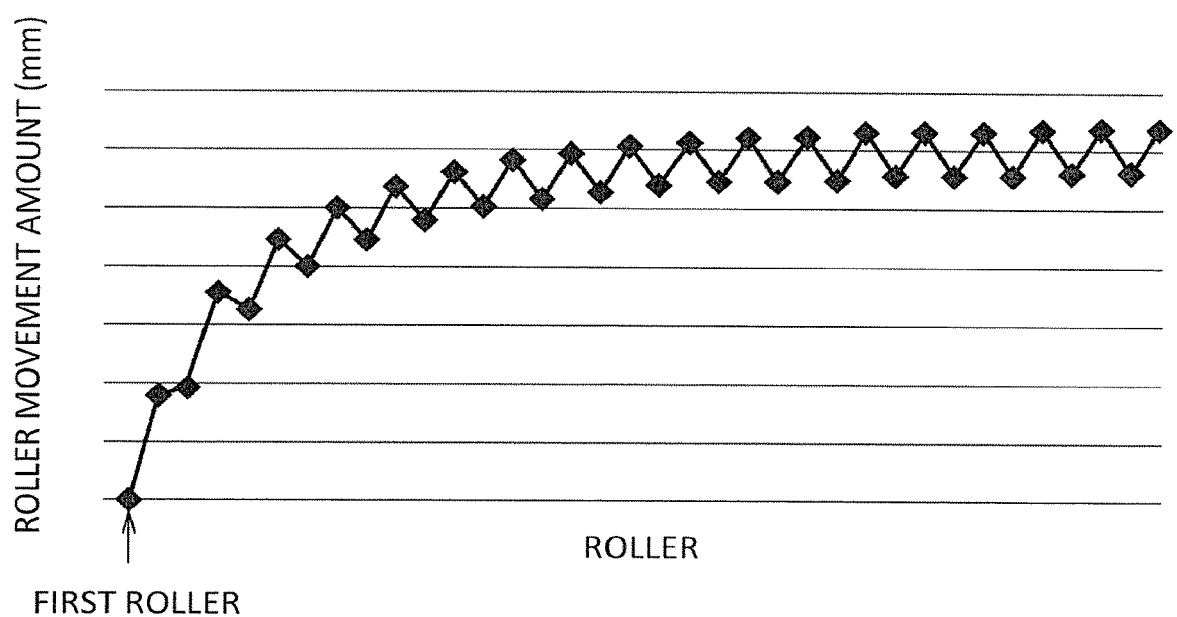
FIG. 10 is a graph for showing respective movement amounts of rollers with respect to a pitch circle when the stretch evenly occurs in the entire region of the chain.

FIG. 10 is a graph for showing respective movement amounts of the rollers 15 with respect to the pitch circle when the stretch evenly occurs in the entire region of the chain 1. In FIG. 10, there are shown respective movement amounts in the following order of the first roller 15a, and then the second roller 15b and the third roller 15c which are arranged on the forward side with respect to the first roller 15a in the rotation direction. With regard to the rollers 15 which are located on the forward side to some extent in the rotation direction with respect to the first roller 15a located on the pitch circle of the driven sprocket 3, the positions of the rollers 15 far from the center of the driven sprocket 3 and the positions of the rollers 15 close to the center of the driven sprocket 3 are respectively settled down to certain values.

Figure 11:
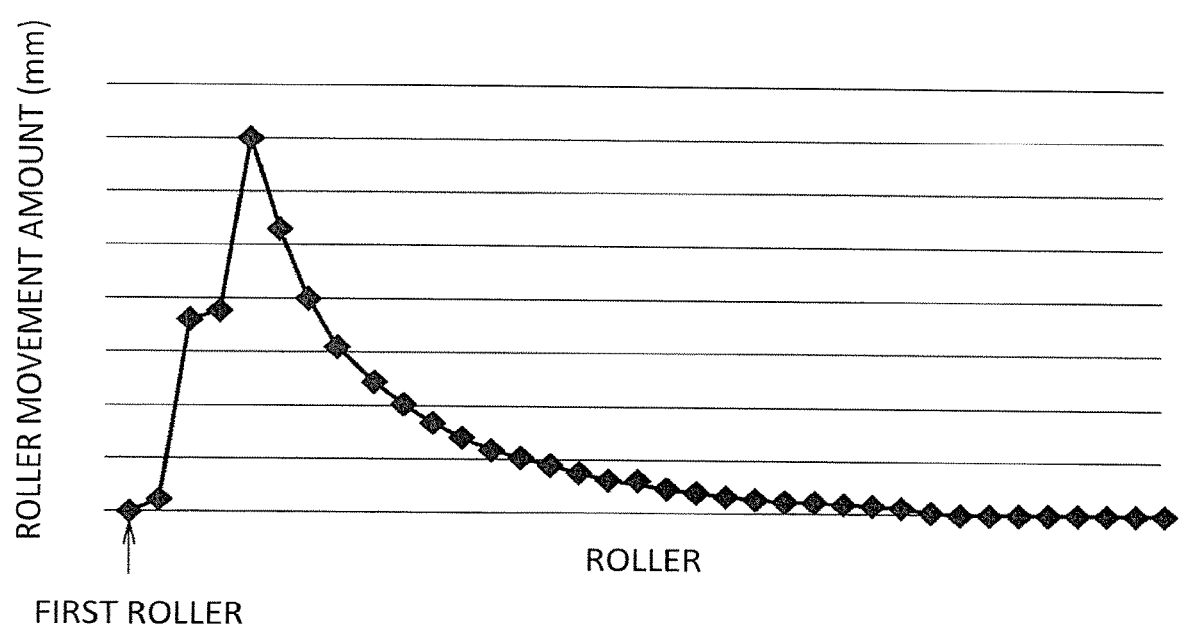
FIG. 11 is a graph for showing respective movement amounts of the rollers with respect to the pitch circle when the stretch occurs only in a part of the region of the chain.

FIG. 11 is a graph for showing respective movement amounts of the rollers 15 with respect to the pitch circle when the stretch occurs only in a part of the region of the chain 1. In FIG. 11, there are shown respective movement amounts of the rollers 15 when the rollers 15 which are present at the portions of the chain 1 having the stretch mesh with the teeth of the driven sprocket 3 on the pitch circle. As can be seen in FIG. 11, some rollers 15 which are arrayed on the forward side in the rotation direction with respect to the rollers 15 being present on the pitch circle are significantly apart from the pitch circle. Moreover, the positions of the plurality of rollers 15 arrayed on the forward side in the rotation direction with respect to the rollers 15 having large movement amounts from the pitch circle gently approach the pitch circle.

Figure 12:
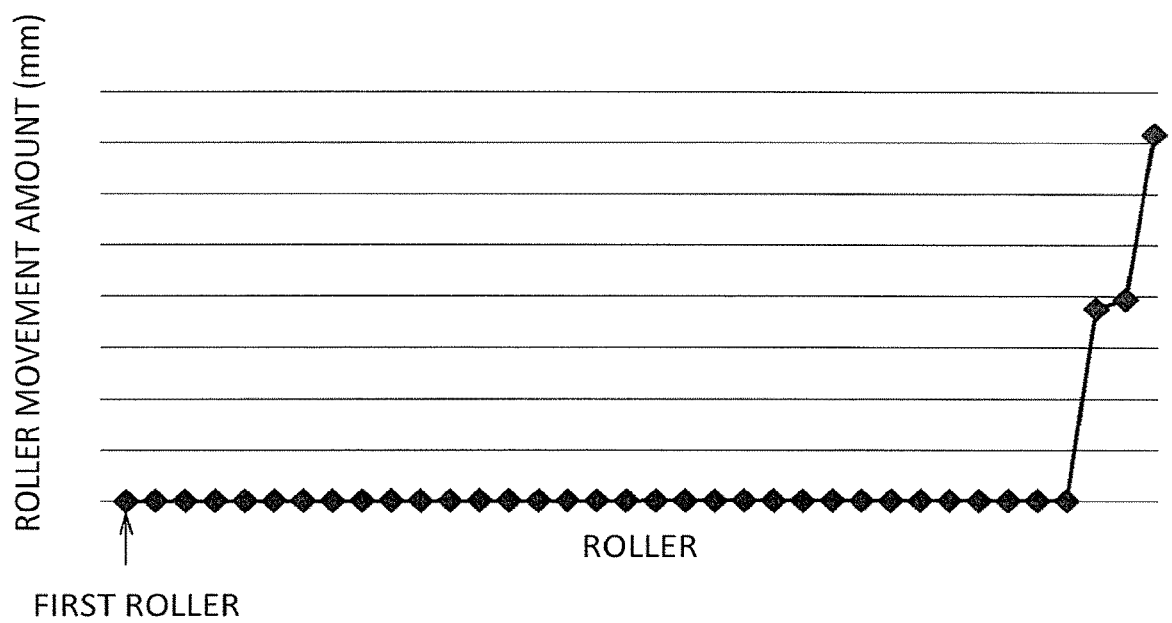
FIG. 12 is a graph for showing respective movement amounts of the rollers with respect to the pitch circle when the stretch occurs only in a part of the region of the chain.

FIG. 12 is a graph for showing respective movement amounts of the rollers 15 with respect to the pitch circle when the stretch occurs only in a part of the region of the chain 1. In FIG. 12, there are shown respective movement amounts of the rollers 15 when the rollers 15 which are present at the portions of the chain 1 having the stretch are present at the forward side in the rotation direction with respect to the rollers 15 meshing with the teeth of the driven sprocket 3 on the pitch circle. As can be seen in FIG. 12, the meshing positions of the rollers 15 on the chain 1 having no stretch are located on the pitch circle, and the meshing positions of the rollers 15 at the portions of the chain 1 having the stretch are significantly apart from the pitch circle.

Based on the fact described above, in any of the case in which the stretch evenly occurs in the entire region of the chain 1 and the case in which the stretch occurs only in a part of the region of the chain 1, in the meshing with the driven sprocket 3, at a position on the forward side by approximately fifteen teeth in the rotation direction from the position of the roller 15 meshing on the pitch circle, a height position of the meshing correlated to the amount of the stretch can be detected.

Figure 13:
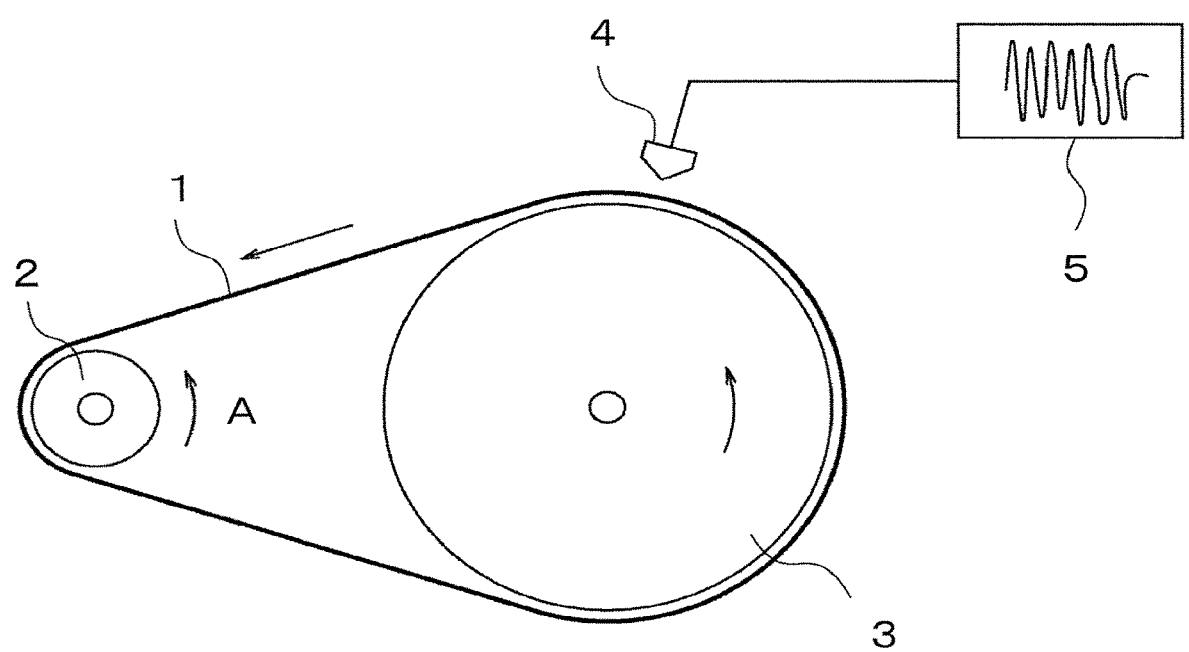
FIG. 13 is a view for illustrating the chain stretch detection device according to the first embodiment of this invention.

Next, description is made of a method of estimating a position of the stretch of the chain 1 and the amount of the stretch thereof using the characteristics of the stretch of the chain 1 and the meshing of the roller 15 with respect to the driven sprocket 3. FIG. 13 is a view for illustrating the chain stretch detection device according to the first embodiment of this invention. The chain 1 is wound around the driving sprocket 2 having the drive force and the driven sprocket 3 being the load. Power is transmitted from the driving sprocket 2 to the driven sprocket 3 through intermediation of the chain 1.

The chain stretch detection device includes a meshing height measurement device 4 and a signal processing device 5. The meshing height measurement device 4 is configured to measure heights of the rollers. The signal processing device 5 is configured to receive input of measurement results given by the meshing height measurement device 4. At a position of the driven sprocket 3 apart on the forward side in the rotation direction by fifteen teeth or more from the teeth of the driven sprocket 3 meshing with the chain 1 on the pitch circle, the meshing height measurement device 4 is installed. The meshing height measurement device 4 is configured to measure heights of the chain 1 in the inter-tooth spaces of the driven sprocket 3. In this example, as the meshing height measurement device 4, a displacement meter of a non-contact type using a laser is used. Moreover, in this example, the meshing height measurement device 4 measures heights of the chain 1 in the inter-tooth spaces of the driven sprocket 3, but may measure heights of the chain 1 in the inter-tooth spaces of the driving sprocket 2.

Figure 14:
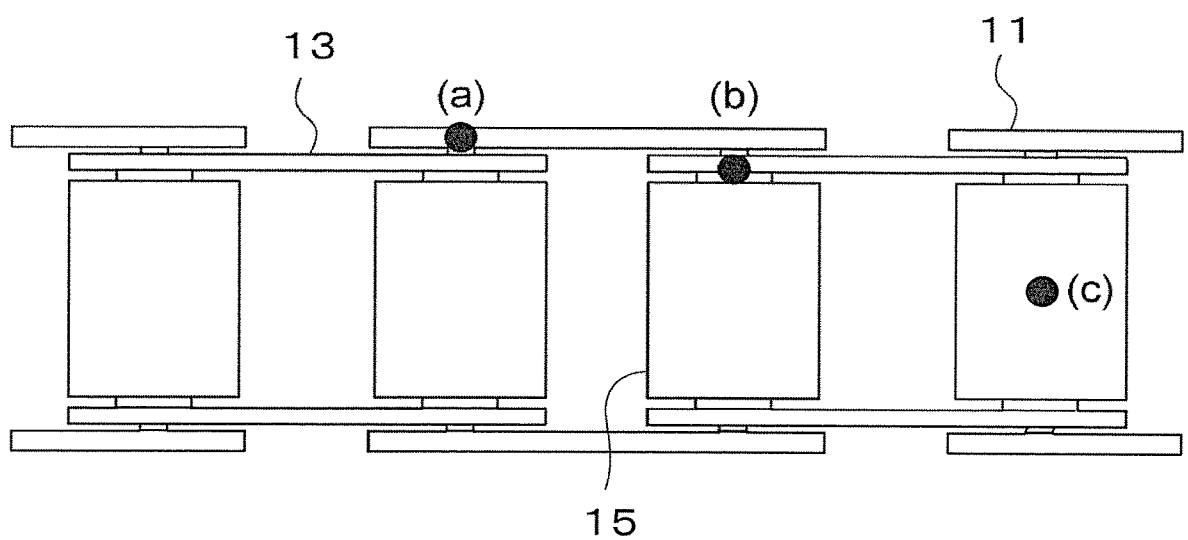
FIG. 14 is a view for illustrating measurement positions in the chain of FIG. 13.

FIG. 14 is a view for illustrating measurement positions in the chain 1 of FIG. 13. In the measurement for the heights of the chain 1 in the inter-tooth spaces of the driven sprocket 3, portions at which the position in the radial direction from the center of the driven sprocket 3 changes with the meshing height as indicated by the points a to c in FIG. 14 are set as measurement points. With this, the meshing height measurement device 4 is capable of measuring the change in meshing height of the chain 1 in the inter-tooth space through irradiation of the points a to c of FIG. 14 with laser. In the step of measuring the meshing heights, the change in meshing height of the chain 1 is measured.

Figure 15:
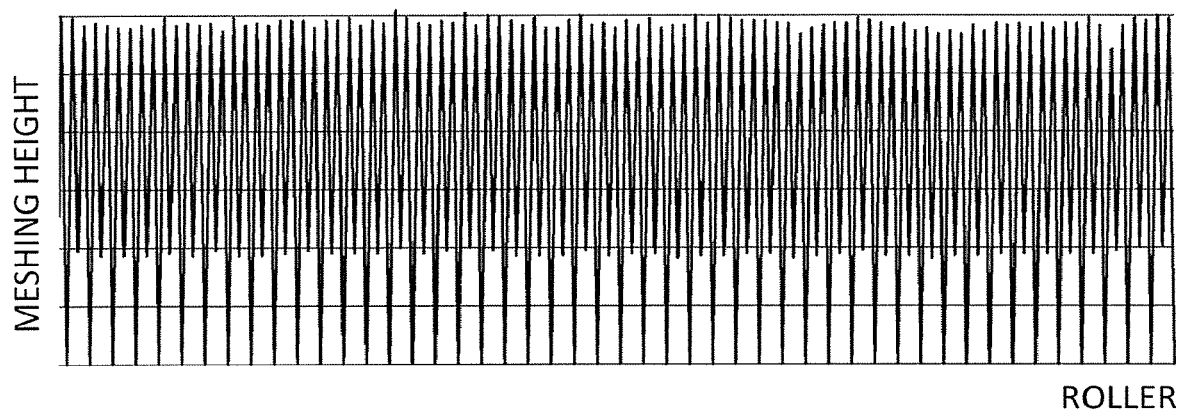
FIG. 15 is a graph for showing meshing heights of the chain when the chain has no stretch or when the chain has small stretch.

Signals obtained by the meshing height measurement device 4 are transmitted to the signal processing device 5. In the signal processing device 5, a signal processing step is performed. The signal processing device 5 uses the signals transmitted from the meshing height measurement device 4 to determine presence or absence of the stretched state in the entire region of the chain 1. In the signal processing device 5, specifically, when the chain 1 has no stretch or when the chain 1 has small stretch, a waveform having no significant difference in meshing height of the rollers 15 in the inter-tooth spaces as shown in FIG. 15 is obtained.

Figure 16:
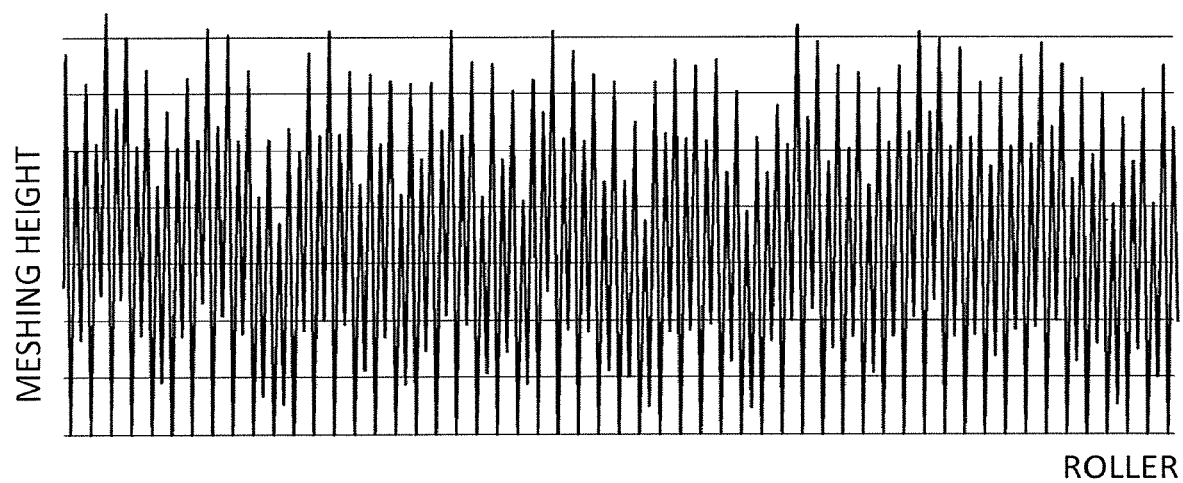
FIG. 16 is a graph for showing meshing heights of the chain when uneven stretch occurs in the entire region of the chain.
Figure 17:
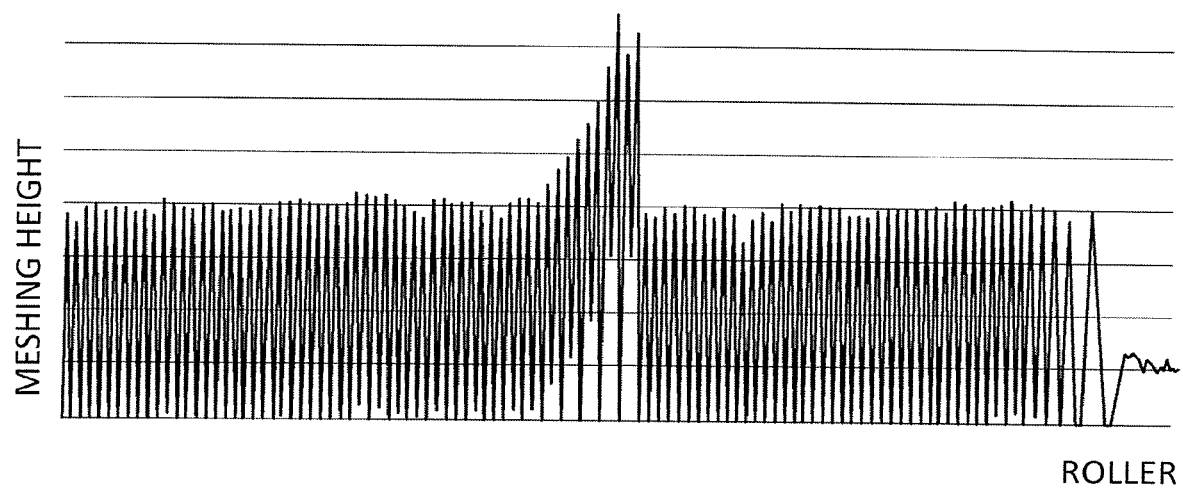
FIG. 17 is a graph for showing meshing heights of the chain when the stretch occurs in a part of the chain.

Meanwhile, when uneven stretch occurs in the entire region of the chain 1, in the signal processing device 5, a waveform having fluctuation in meshing height of the plurality of arrayed rollers 15 every other roller 15 as shown in FIG. 16 is obtained. Moreover, when the stretch occurs in a part of the region of the chain 1, in the signal processing device 5, a waveform representing a state in which meshing positions at which the stretch occurs are apparently different from meshing positions of other portions as shown in FIG. 17 is obtained. Moreover, an approximate stretch ratio of the chain 1 can be estimated through use of a difference in meshing height between adjacent rollers 15 shown in FIG. 16 and a difference in meshing height between an even waveform portion and a maximally displaced portion shown in FIG. 17. Specifically, through comparison of a difference in meshing height between adjacent rollers 15 shown in FIG. 16, a difference in meshing height between the even waveform portion and the maximally displaced portion shown in FIG. 17, and a value determined in advance by construction through use of, for example, CAD based on specifications of the chain 1 subjected to the measurement, the approximate stretch ratio of the chain 1 can be estimated.

Figure 18A:
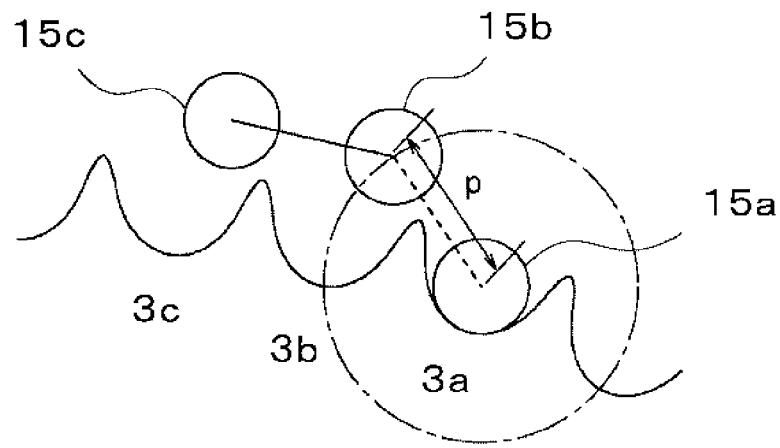
FIGS. 18A, 18B and 18C are views for illustrating a method of determining meshing heights given by the stretch of the chain by construction through use of, for example, CAD.
Figure 18B:
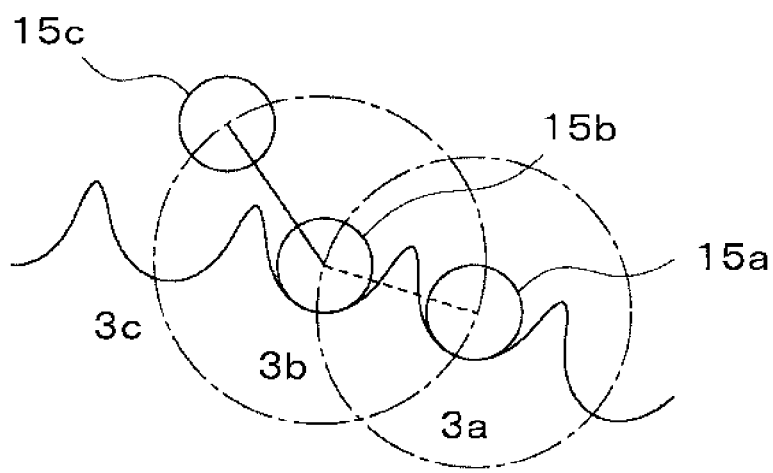
Figure 18C:
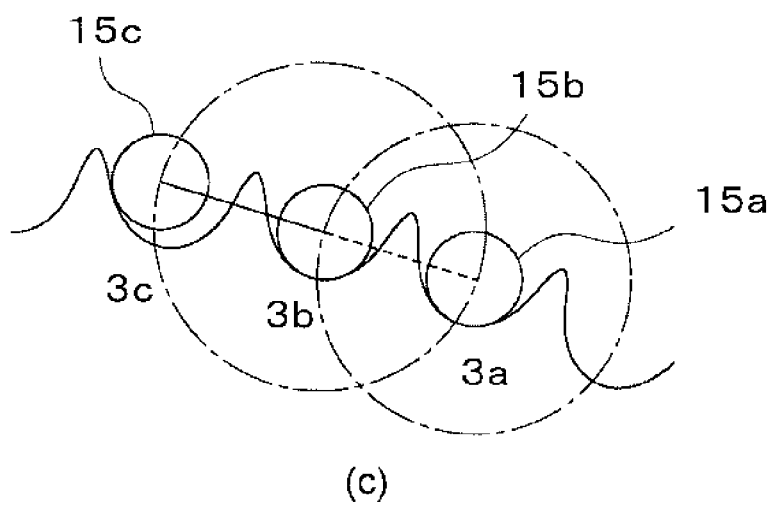

FIGS. 18A, 18B and 18C are views for illustrating a method of determining meshing heights given by the stretch of the chain 1 by construction through use of, for example, CAD. First, assumption is given of the first roller 15a meshing at an ideal position in the inter-tooth space of the driven sprocket 3. In this case, the surface of the first roller 15a is held in contact with a tooth surface of a tooth 3a of the driven sprocket 3. In this case, the rollers 15 have a radius r.

The second roller 15b which is adjacent to the first roller 15a in the rotation direction moves on a circumference having the chain pitch p as a radius from a center of the first roller 15a. The second roller 15b having the radius r is moved along the circumference having a center at a center of the first roller 15a meshing with the tooth 3a of the driven sprocket 3, to thereby determine, by construction, a position at which a tooth surface of a tooth 3b of the driven sprocket 3 and a surface of the second roller 15b are in contact with each other. The position determined in such a manner is defined as a meshing position between the driven sprocket 3 and the second roller 15b, and a distance between the center of the driven sprocket 3 and the center of the second roller 15b is defined as a meshing height of the second roller 15b. In the manner similar to the case of the second roller 15b, a meshing position and a meshing height of the third roller 15c can be determined.

Information as to the meshing positions and the meshing heights of the rollers 15 is information uniquely determined in a geometrical manner as the shape of the driven sprocket 3, the chain pitch length, and the shape of the rollers 15 are determined. Other than the method of determination through the procedure illustrated in FIGS. 18A, 18B and 18C, determination can be made through use of a general-purpose geometric tool.

With the chain stretch detection device according to the first embodiment of this invention, in a normal driving state of the chain 1, the stretch of the chain 1 in the entire region of the chain 1 can be evaluated. With regard to the even stretch of the chain 1 in the entire region, the amount of the stretch thereof can be estimated. With regard to the local stretch, when a projecting portion which apparently gives a specific displacement to the signals is provided to a link specific to the measurement point, the amount of the stretch as well as the position with the stretch can also be checked.

Second Embodiment

Figure 19:
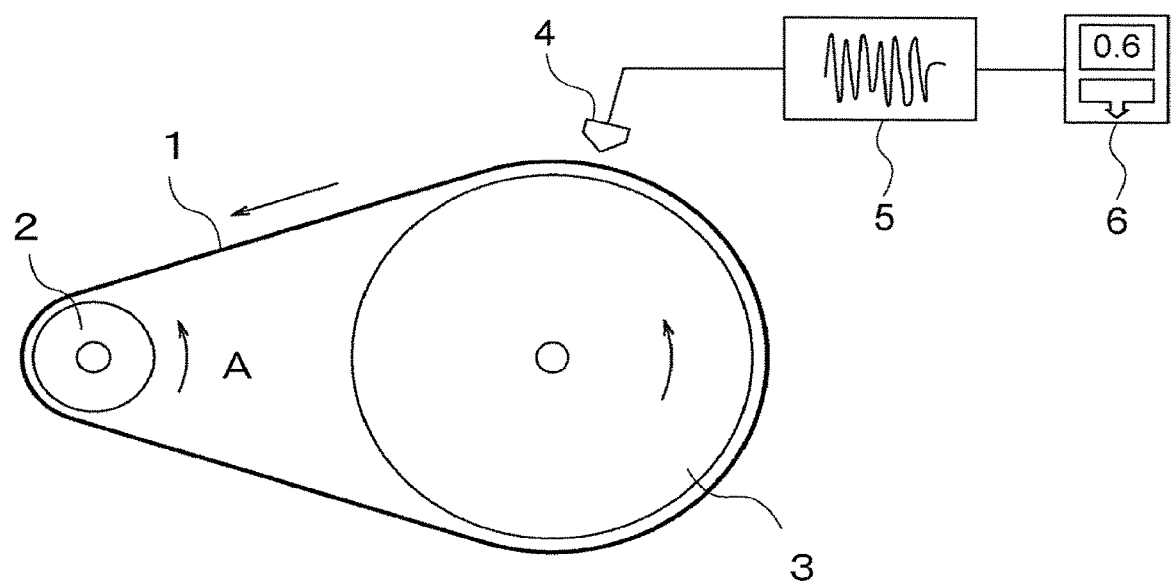
FIG. 19 is a view for illustrating a chain stretch detection device according to a second embodiment of this invention.

FIG. 19 is a view for illustrating a chain stretch detection device according to a second embodiment of this invention. The chain stretch detection device according to the second embodiment of this invention further includes an outward notification device 6 configured to receive signals from the signal processing device 5. The outward notification device 6 is configured to automatically measure the amount of the stretch based on the waveform of the meshing heights transmitted to the signal processing device 5, display the presence of the stretch, and display a portion having a local stretch when the local stretch has been detected. Thus, the outward notification device 6 includes a display. Moreover, the outward notification device emits light to the outside or generates sound to notify, to the outside, that the stretch has occurred in the chain 1.

As described above, with the chain stretch detection device according to the second embodiment of this invention, the presence of the stretch in the chain 1 can be found without calculation based on the signals given to the signal processing device 5. When the local stretch occurs in the chain 1, the position of the local stretch can be specified while operating the chain 1 during the measurement.

Third Embodiment

Figure 20:
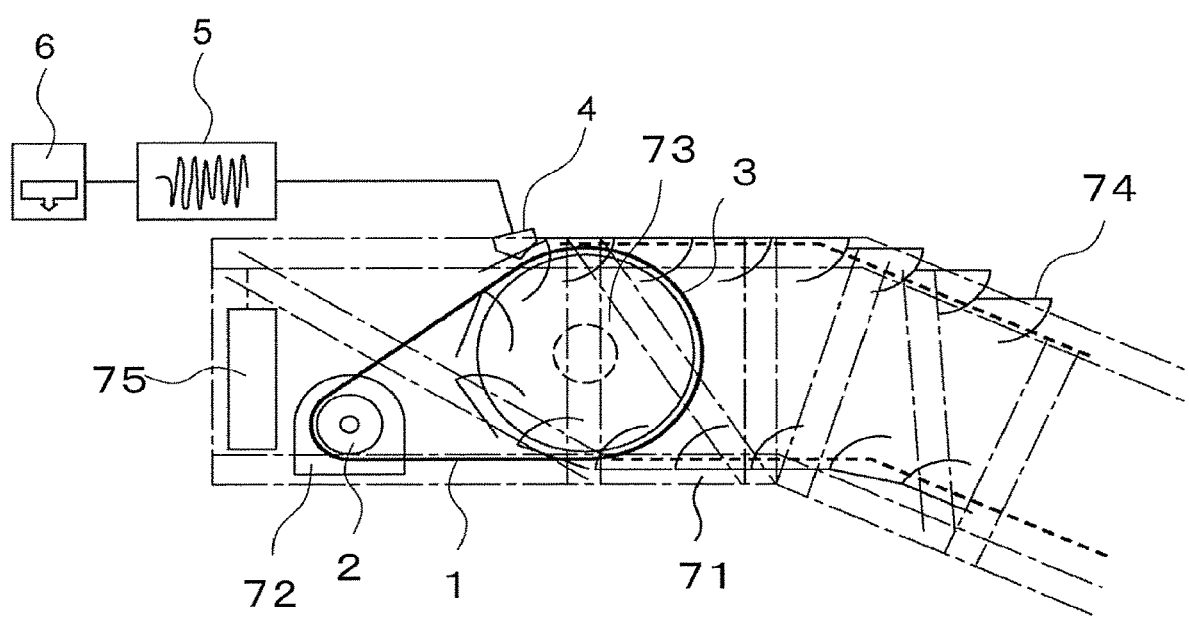
FIG. 20 is a view for illustrating a passenger conveyor according to a third embodiment of this invention.

FIG. 20 is a view for illustrating a passenger conveyor according to a third embodiment of this invention. The passenger conveyor according to the third embodiment of this invention includes a housing 71, a power unit 72, the driving sprocket 2, the driven sprocket 3, the chain 1, a main shaft 73, steps 74, and a controller unit 75. The power unit 72 is configured to generate a drive force. The driving sprocket 2 is mounted to an output shaft of the power unit 72. The chain 1 is wound around the driving sprocket 2 and the driven sprocket 3. The main shaft 73 has the driven sprocket 3 mounted thereto. The steps 74 are configured to move along with rotation of the main shaft 73. The controller unit 75 accommodates a power supply and a control board configured to control an operation of the passenger conveyor. The power unit, the driving sprocket 2, the driven sprocket 3, the chain 1, the main shaft, the steps, and the controller unit are accommodated in the housing.

The chain 1 serves to transmit all of power required for the passenger conveyor. Therefore, during driving of the passenger conveyor, the chain 1 is held in a state in which the tensile force always acts on the chain 1. Thus, it is expected that the stretch occurs in the chain 1 over years. Therefore, in order to operate the passenger conveyor always in a favorable state, it is required to periodically measure the stretch of the chain 1 and prevent deterioration of the state of the chain 1 due to the stretch.

In the third embodiment, the chain stretch detection device described in the first embodiment or the second embodiment is used at the time of periodic inspection for the chain 1 of the passenger conveyor. In general, a motor with high speed and relatively small output torque is used for the power unit 72 for the purpose of achieving downsizing of the power unit 72. A speed reducer decelerates the output of the motor through use of the chain 1. As a result, low-speed and large torque is transmitted to the main shaft 73. In order to decelerate the output of the motor through use of a chain drive system, the number of teeth of the driven sprocket 3 with respect to the driving sprocket 2 corresponds to multiples equivalent to the deceleration ratio. Therefore, the number of teeth of the driven sprocket 3 in mesh with the chain 1 is larger than the number of teeth of the driving sprocket 2 in mesh with the chain 1. As illustrated in FIG. 10, with the chain stretch detection device described in the first embodiment or the second embodiment, the meshing height of the tooth arranged on the forward side in the rotation direction by the certain number of teeth from the roller 15 meshing at the tooth bottom is measured, and it is more suitable to detect the stretch of the chain 1 on the driven sprocket 3 having a larger number of meshing teeth, as compared to detection of the stretch of the chain 1 on the driving sprocket 2.

In the third embodiment, the meshing height measurement device 4 is arranged near a part of the chain 1 at which meshing of the driven sprocket 3 integrated to the main shaft 73 is cancelled, and is fixed to the housing 71, to thereby measure the meshing height. At the time of measurement, the signal processing device 5 configured to process the measured signals and the outward notification device 6 configured to notify the result of measurement to the outside are also installed and used together with the meshing height measurement device 4 at the time of inspection.

As described above, with the passenger conveyor according to the third embodiment of this invention, the stretch of the chain 1 with respect to a passenger conveyor being currently installed can easily be measured at the time of inspection.

Fourth Embodiment

Figure 21:
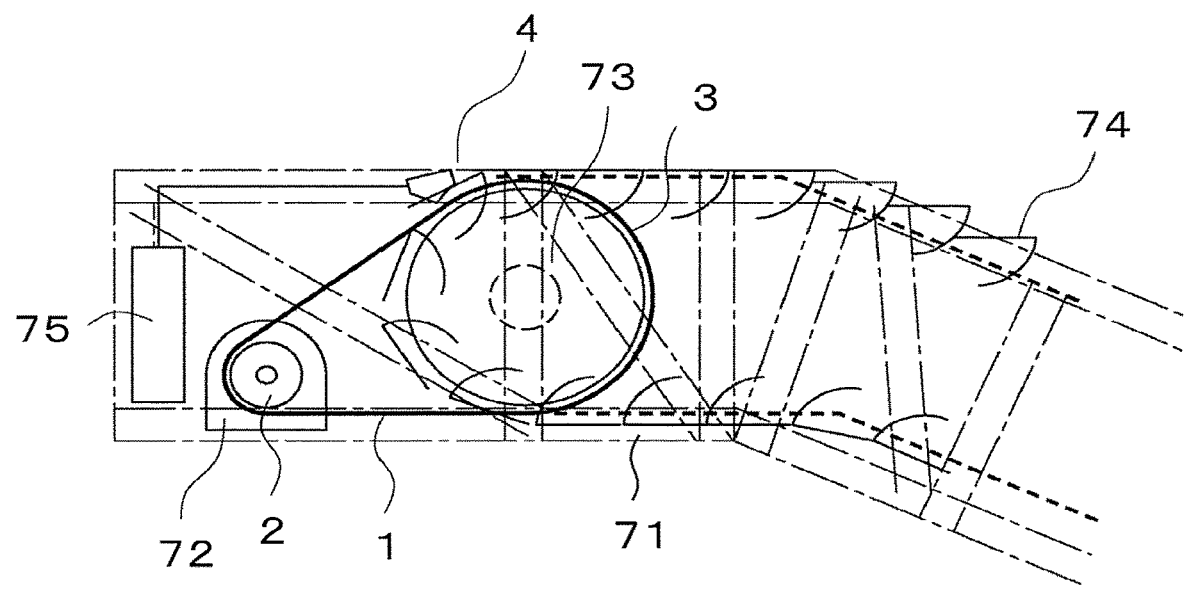
FIG. 21 is a view for illustrating a passenger conveyor according to a fourth embodiment of this invention.

FIG. 21 is a view for illustrating a passenger conveyor according to a fourth embodiment of this invention. In the fourth embodiment, signals obtained by the meshing height measurement device 4 fixed to the housing are acquired by the control board accommodated in the controller unit 75. Moreover, as a function of the control board, detection of positions of the stretch and local stretch of the chain 1, and display of the respective information pieces to the outside are performed. Other configurations are the same as those of the third embodiment.

As described above, with the passenger conveyor according to the fourth embodiment of this invention, the stretch of the chain 1 can always be monitored, not limited to the time of periodic inspection. Therefore, the periodic inspection is not required, thereby being capable of reducing the need for work and improving the reliability of the passenger conveyor.

REFERENCE SIGNS LIST

1 chain, 2 driving sprocket, 3 driven sprocket, 4 meshing height measurement device, 5 signal processing device, 6 outward notification device, 11 outer plate, 12 pin, 13 inner plate, 14 bush, 15 roller, 71 housing, 72 power unit, 73 main shaft, 74 step, 75 controller unit

The invention claimed is:

1. A chain stretch detection device configured to detect stretch of a chain in a power transmission device,
    the power transmission device comprising:
        a driving sprocket configured to rotate through transmission of a drive force thereto;
        a driven sprocket supported on a rotatable rotary shaft; and
        a chain, which is wound around the driving sprocket and the driven sprocket, and is configured to transmit power of the driving sprocket to the driven sprocket,
    the chain stretch detection device comprising:
        a meshing height measurement device configured to measure meshing heights of the chain at a position along the chain in which the driving sprocket or the driven sprocket is in contact with and meshes with the chain; and
        a signal processing device configured to determine a height difference between adjacent rollers in the chain based on signals acquired by the meshing height measurement device and estimate an amount of the stretch of the chain based on the determined height difference.

2. The chain stretch detection device according to claim 1, wherein the signal processing device is configured to estimate an amount of the stretch of the chain, which is given when a local stretch of the chain occurs, and a portion of the chain having the local stretch based on the height difference between the adjacent rollers in the chain.

3. The chain stretch detection device according to claim 1, further comprising a display configured to display the amount of the stretch of the chain estimated by the signal processing device.

4. The chain stretch detection device according to claim 2, further comprising a display configured to display the amount of the stretch of the chain and the portion of the chain having the local stretch, which are given when the local stretch of the chain occurs and have been estimated by the signal processing device.

5. The chain stretch detection device according to claim 1, wherein the meshing height measurement device is configured to measure a meshing height at a portion of the chain which is located on a forward side in a rotation direction by fifteen teeth or more from a tooth located closest to extension of a straight line connecting a rotary axis of the driving sprocket and a rotary axis of the driven sprocket.

6. A chain stretch detection method of detecting a stretch of a chain in a power transmission device,
    the power transmission device comprising:
        a driving sprocket configured to rotate through transmission of a drive force thereto;
        a driven sprocket supported on a rotatable rotary shaft; and
        a chain, which is wound around the driving sprocket and the driven sprocket, and is configured to transmit power of the driving sprocket to the driven sprocket,
    the chain stretch detection method comprising:
        a meshing height measurement step of measuring meshing heights of the chain at a position along the chain in which the driving sprocket or the driven sprocket is in contact with and meshes with the chain; and
        a signal processing step of determining a height difference between adjacent rollers in the chain based on signals acquired in the meshing height measurement step and estimating an amount of the stretch of the chain based on the determined height difference.

7. A passenger conveyor, comprising:
a driving sprocket configured to rotate through transmission of a drive force from a motor thereto;
a driven sprocket, which is connected to a step driving device configured to drive steps, and is supported on a rotatable rotary shaft;
a chain, which is wound around the driving sprocket and the driven sprocket, and is configured to transmit power of the driving sprocket to the driven sprocket;
a meshing height measurement device configured to measure a meshing height of the chain at a position along the chain in which the driving sprocket or the driven sprocket is in contact with and meshes with the chain; and
a signal processing device configured to determine a height difference between adjacent rollers in the chain based on signals acquired by the meshing height measurement device and estimate an amount of the stretch of the chain based on the determined height difference.

8. The passenger conveyor according to claim 7, wherein the meshing height measurement device is configured to measure meshing heights of the chain in a range in which the driven sprocket meshes with the chain.

* * * * *